(12) United States Patent
Bentkower et al.

(10) Patent No.: US 6,651,068 B1
(45) Date of Patent: Nov. 18, 2003

(54) FACT PARTICIPANT DATABASE ARCHITECTURE

(75) Inventors: Lionel Bentkower, Foster City, CA (US); Wenjie Yao, Santa Clara, CA (US)

(73) Assignee: Amdocs Software Systems Limited, Dublin (IE)

( * ) Notice: Subject to any disclaimer, the term of this patent is extended or adjusted under 35 U.S.C. 154(b) by 255 days.

(21) Appl. No.: 09/677,455

(22) Filed: Oct. 2, 2000

Related U.S. Application Data

(60) Provisional application No. 60/157,411, filed on Oct. 1, 1999.

(51) Int. Cl.[7] .......................... G06F 17/00; G06F 17/30
(52) U.S. Cl. .................. 707/100; 707/1; 707/7; 715/509
(58) Field of Search .................. 707/1, 7, 10, 100, 707/200, 205, 509, 500.1; 715/509, 500.1, 516

(56) References Cited

U.S. PATENT DOCUMENTS 5,499,364 A * 3/1996 Klein et al. .................. 709/202
6,405,212 B1 * 6/2002 Samu et al. .................. 707/10

* cited by examiner

*Primary Examiner*—Alford Kindred
(74) *Attorney, Agent, or Firm*—Haynes and Boone, LLP

(57) ABSTRACT

An event database table architecture includes an event table having information such as, for example, date, time, and activity. An event table has a field for identifying one of a plurality of participating tables, and a field for identifying a row within the identified participating table. A participant table has a field for identifying one of a plurality of participating tables, a second field for identifying a row within the identified participating table, a role code, and a row number identifying the event in the event table. Thus, each entry in the participant table relates to a unitary entry in the event table and also relates to a unitary row in one of the participating tables. Each event, participant, and act of participating can be accessed from any other related data item without accessing extraneous or unrelated data items.

16 Claims, 1 Drawing Sheet

FACT PARTICIPANT DATABASE ARCHITECTURE

CROSS-REFERENCE TO RELATED APPLICATION

This is a continuation of prior Provisional Application Ser. No. 60/157,411, filed Oct. 1, 1999.

TECHNICAL FIELD

The present invention relates to a database table architecture for storing data representative of an event in a table, wherein the event further relates to a plurality of other database tables. This relationship of the data in the event database table to other database tables is scaleable and expandable.

BACKGROUND OF THE INVENTION

Database tables are well known in the art. One example of use of a database table is to store data representative of an event. This event database table, storing data representing the event, is related to a plurality of other database tables.

Database tables are known in the art. Commonly, a database table contains a plurality of entries. Each entry represents an event and has a plurality of fields. In general, each entry represents an event, and has data representing date, time, the activity, and the participants in the event. Thus, for example, an entry in the first field of the database table, would have the date of the event entered therein. In the second field, the time of the event would be entered. The third field would represent the activity. The fourth field would represent one of the participants in the event, such as a business organization and an entry therein referring to a particular row in a business organization table. A fifth field might represent data in a site table, with the data in the fifth field pointing to the row number in the site table. A sixth field may refer to a case table and to a row number in that case table. A typical event table in a business world application could represent sales activity, such as initial sales call, follow-up, close, delivery, service, etc. made to a particular business organization, at a particular site, with an assigned case number.

In general, the prior art event database table architecture has an event table relating to many other tables such as business organization, site, and case. A problem with the event database table architecture of the prior art 1 is that it is not scaleable. Because one entry in the event table can relate to many other tables, additional columns or fields and relationships must be created if additional participants or new data is to be added. This limits the scaleability and the searchability of the event database table architecture of the prior art.

SUMMARY OF THE INVENTION

In the present invention, an event database table architecture includes an event table having date, time, activity, a field for identifying one of a plurality of participating tables, and a field for identifying a row within the identified participating table. A participant table has a field for identifying one of a plurality of participating tables, a second field for identifying a row within the identified participating table, a role code, and a row number identifying the event in the event table.

DETAILED DESCRIPTION OF THE INVENTION

Figure 1:
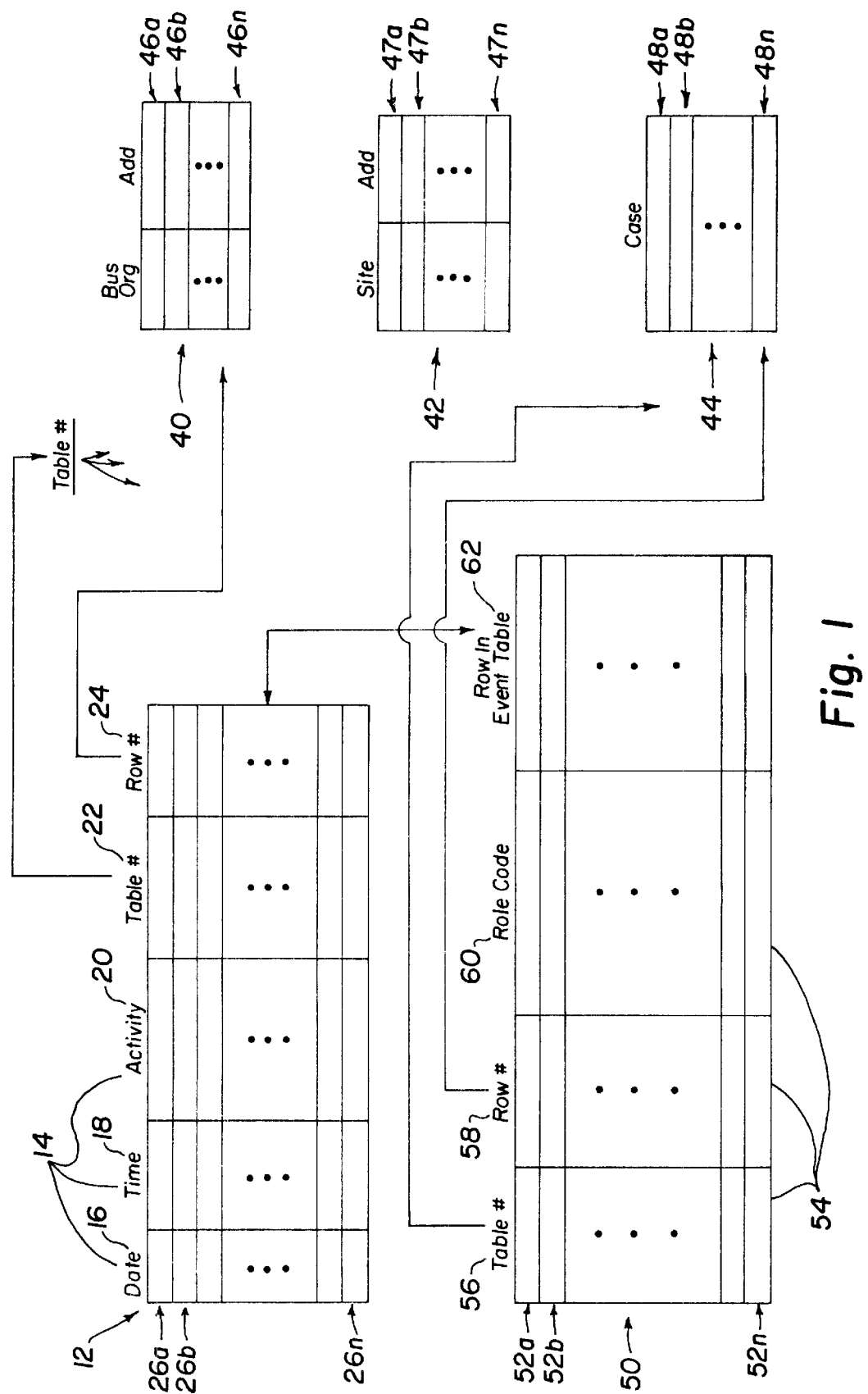
FIG. 1 is a block diagram of the present invention.

The present invention is described by reference to a drawing showing one or more examples of how the invention can be made and used. In the drawing, reference characters are used to indicate many referenced parts. The drawing is not necessarily represeritative of a tangible physical structure, especially in terms of scale and proportion. The drawing is a block diagram in which certain parts have been exaggerated to better illustrate details and features of the invention.

As used herein, the following terms shall have the following meanings. "Event table" means a table where information about an event is recorded and where a reference is made to one row in a participating table (i.e., "the most informative row"). "Participant table" denotes a table which holds an entry for each participant and how it participated in the event (role code). In addition, each participant entry references one participating table and one row in that table. "Participating table" means any table other than the event table or the participant table. A participating table holds information about the event participants but not information about their participation in the event, which is stored in the participant table.

FIG. 1 depicts a block diagram of the event database architecture 10 structure and methods of the present invention. An event table 12 has a plurality of entries having fields 14 defining the date 16, the time 18, and an activity code 20, a table number 22, and a row number 24 within an identified table. The event table 12 contains a table number field 22, identifying the table with which the event is associated, and a row field 24 identifying the particular row within the identified table with which the event is associated. Each entry in a row 26(*a* . . . *n*) represents an event. Note that in implementation, the date and the time may be in one field. The activity code 20 identifies the type of event, such as create case, create quote, etc. This activity code 20 is descriptive of the event. The table number 22 identifies the table that contains the "most informative participant" in a particular event. For example, if a case were created, the phone log of the call resulting in the creation of the case would be entered. The most informative participant is defined when the activity is defined. The most informative participant is a run-time designation, which allows the application to display the participant row that contains the details of the event. For example, if the event were receipt of an e-mail about a case, the most informative participant would be the row containing the text of the e-mail. This is termed "drill down object," and the system would display this object whenever the user selected the event in the user interface. Finally, a field identifying the row number is the row number within the table of the "most informative participant."

A plurality of participating tables 40, 42 and 44 are also provided. Each participating table identifies a participant in a particular event. For example, table 40, represents identification of the participant in the particular event recorded in the event table 12. Thus, table 40 refers to a business organization. Table 42 refers to the site or the location of the event. For example, although a business organization may be identified in the table 40, that particular business organization may have a plurality of locations or sites. Table 44 represents a case, a support problem for the event.

A participant table 50 is also created. The participant table 50 contains a plurality of entries 52(a . . . n). Each entry 52 is a row, with one row for each data item or object participating in the event. Each entry 52 has a plurality of fields 54. A first field 56 indicates the table number, or identification of a particular participating table, such as table 40, 42 or 44. Thus, the first field 56 refers to one of a plurality of participating tables and identifies the particular participating table, for example, the customer contact who made a particular call. A second field 58 in the entry 52 is a row number and refers to the row number 46(a . . . n) within the identified participating table 40, typically the identity of the customer who made the call. A third field 60 in the participant table 50 is a code to identify the role the participant played in the event being recorded, for example, communication initiator. A fourth field 62 identifies a row 26n within the event table 12 to which the entry 52n relates. Thus, for example, one entry, 52b, in the participant table 50 might refer to an entry in row 26b of the event table 12.

From the foregoing, it can be seem that each entry 52n in the participant table 50 relates to a corresponding entry 26n in the event table 12 and also relates to a unitary row 46n in one of the participating tables, participating table 40 for example. A role code 60n identifies the role which the participant played in the event. It does not refer to the event type. The event itself is described by an activity code 20n. Thus, each row 26n in the event table 12 becomes an object in the database architecture.

As can be seen from the foregoing, the architecture shown in FIG. 1, has the advantage of being highly scaleable. In the event a new type of participant is created, in turn creating a new participating table, a plurality of entries in that table are created as well. Reference to the newly created table need only be made by entering the new table number under the field for table number. A particular row number would then identify the specific individual participant in that new type of participant. Thus, new participating tables can be added without creating additional fields in the event table 12.

Furthermore, searching for participants in a particular event recorded in the event table 12 is greatly simplified. For example, if it is desired to determine who the participants were in the event identified in row number 26a in the event table 12, such information may be obtained by scanning the fourth field 62 in the participant table 50 for entries that match "26a." When a matching entry is found, the other fields associated with that entry refer to the table number and the row number from which the particular participant can be identified. In addition, the role code 60 identifies the role that participant had in the event, such as buyer, agent, or interpreter, etc. Moreover, if there were a plurality of participants in any particular event, such a search would also cover other participants in the particular transaction.

Thus, another of the advantages of the architecture of the invention shown in FIG. 1 is that there is no conceptual limit to the number of participants in any particular event that can be recorded in the event table 12. Further, there is no need to alter the structure of event table 12 to accommodate new types of participants. Each participant refers to the underlying participating table, in this example 40, 42, or 44, and hence is scaleable. Finally, the use of a role code 60n can further identify the function of the participants.

Further, if a user scans the event table 12 and determines that a particular event having a particular date and time is of interest, then all the user has to do is to "click" or link to the particular participating table and the row number therein to determine the "most informative participant" who participated in that particular event. The user is led directly to the participating table and row from which the particular participant in that event can be examined.

The embodiments shown and described above are only exemplary. Many details are often found in the art such as: machine types, machine languages, and table representations. Therefore, many such details are neither shown nor described. It is not claimed that all of the details, parts, elements, or steps described and shown were invented herein. Even though numerous characteristics and advantages of the present invention have been set forth in the foregoing description, together with details of the structure and function of the invention, the disclosure is illustrative only, and changes may be made in the detail within the principles of the invention to the full extent indicated by the broad general meaning of the terms used in the attached claims.

The restrictive description and drawing of the specific examples above do not point out what an infringement of this patent would be, but are to provide at least one explanation of how to make and practice the invention. The limits of the invention and the bounds of the patent protection are measured by and defined in the following claims.

What is claimed is:

1. A method for storing data representative of an event comprising:

creating a plurality of participating tables for representing the identification of individuals participating in a particular business event;

creating a business event table for representing the identification of one participating table relating to each business event and for identifying one row within the identified participating table relating to each event;

creating a participant table for representing the individuals participating in each event, and for storing information relating to each participating table corresponding to a particular individual; and using the relationship among each entry in the participant table with a unitary entry in the event table, and a unitary row in one participating table, to store or retrieve data representative of an event.

2. The method of claim 1 wherein
one or more of the table entries comprise objects.

3. The method of claim 1 wherein
all of the table entries comprise objects.

4. The method of claim 1 wherein
the steps are carried out in a distributed computing environment.

5. A method for storing data representative of an event comprising the machine implemented method of:

creating a plurality participating tables, each having a plurality of rows and columns representing the identification of an individual participating in a particular business event;

creating an event table having a plurality of rows and columns wherein
each event table row corresponds to a particular business event, and wherein
each event table column corresponds to an information field for storing information relating to each business event;

creating a first event table field for identifying one of the plurality of participating tables relating to each event table row;

creating a second event table field for identifying one row within the identified participating table relating to each business event;

creating a participant table having a plurality of rows and columns wherein
 each participant table row corresponds to an individual participating in a particular event, and wherein
  each participant table column corresponds to an information field for storing information relating to each participating table corresponding to an individual participating in a particular event;
 creating a first participant table field for identifying one of the plurality of participating tables relating to each participant table row;
creating a second participant table field for identifying one row within the identified participating table;
creating a third participant table field for identifying the role of the individual in the particular event; and
creating a forth participant table field identifying a row in the event table to which the individual in the particular event relates.

6. The method of claim 5 wherein
one or more of the information fields comprise objects.

7. The method of claim 5 wherein
all of the information fields comprise objects.

8. The method of claim 6 wherein
the steps are carried out in a distributed computing environment.

9. A method for storing data representative of an event comprising the machine implemented method of:
 means for creating a plurality participating tables, each having a plurality of rows and columns representing the identification of an individual participating in a particular business event;
 means for creating an event table having a plurality of rows and columns wherein
  each event table row corresponds to a particular business event, and wherein
 each event table column corresponds to an information field for storing information relating to each business event;
 means for creating a first event table field for identifying one of the plurality of participating tables relating to each event table row;
 means for creating a second event table field for identifying one row within the identified participating table relating to each business event;
 means for creating a participant table having a plurality of rows and columns wherein each participant table row corresponds to an individual participating in a particular event, and wherein each participant table column corresponds to an information field for storing information relating to each participating table corresponding to an individual participating in a particular event;
 means for creating a first participant table field for identifying one of the plurality of participating tables relating to each participant table row;
 means for creating a second participant table field for identifying one row within the identified participating table;
 means for creating a third participant table field for identifying the role of the individual in the particular event; and
 means for creating a forth participant table field identifying a row in the event table to which the individual in the particular event relates.

10. The system of claim 9 wherein
one or more of the information fields comprise objects.

11. The system of claim 9 wherein
all of the information fields comprise objects.

12. The system of claim 9 wherein
the system comprises a distributed computing environment.

13. A program storage device readable by machine, tangibly embodying a program of instructions executable by machine to perform a method for storing data representative of an event comprising, the method comprising:
 creating a plurality participating tables, each having a plurality of rows and columns representing the identification of an individual participating in a particular business event;
 creating an event table having a plurality of rows and columns wherein
  each event table row corresponds to a particular business event, and wherein
   each event table column corresponds to an information field for storing information relating to each business event;
 creating a first event table field for identifying one of the plurality of participating tables relating to each event table row;
 creating a second event table field for identifying one row within the identified participating table relating to each business event;
 creating a participant table having a plurality of rows and columns wherein
  each participant table row corresponds to an individual participating in a particular event, and wherein
   each participant table column corresponds to an information field for storing information relating to each participating table corresponding to an individual participating in a particular event;
 creating a first participant table field for identifying one of the plurality of participating tables relating to each participant table row;
 creating a second participant table field for identifying one row within the identified participating table;
 creating a third participant table field for identifying the role of the individual in the particular event; and
 creating a forth participant table field identifying a row in the event table to which the individual in the particular event relates.

14. The program storage device of claim 13 wherein
one or more table entries comprise objects.

15. The program storage device of claim 13 wherein
all table entries comprise objects.

16. The program storage device of claim 13 wherein
the program storage device is readable by a plurality of distributed machines in communication with one another.

\* \* \* \* \*